United States Patent
Motoori

(10) Patent No.: US 12,515,878 B2
(45) Date of Patent: Jan. 6, 2026

(54) TRANSPORT SYSTEM

(71) Applicant: MURATA MACHINERY, LTD., Kyoto (JP)

(72) Inventor: Yoichi Motoori, Inuyama (JP)

(73) Assignee: MURATA MACHINERY, LTD., Kyoto (JP)

( * ) Notice: Subject to any disclaimer, the term of this patent is extended or adjusted under 35 U.S.C. 154(b) by 333 days.

(21) Appl. No.: 18/265,456

(22) PCT Filed: Oct. 13, 2021

(86) PCT No.: PCT/JP2021/037889
§ 371 (c)(1),
(2) Date: Jun. 6, 2023

(87) PCT Pub. No.: WO2022/130758
PCT Pub. Date: Jun. 23, 2022

(65) Prior Publication Data
US 2024/0025637 A1     Jan. 25, 2024

(30) Foreign Application Priority Data
Dec. 16, 2020 (JP) ................. 2020-208274

(51) Int. Cl.
*B65G 1/04*     (2006.01)
*B65G 1/137*    (2006.01)
*B65G 47/61*    (2006.01)

(52) U.S. Cl.
CPC ......... *B65G 1/0457* (2013.01); *B65G 1/0485* (2013.01); *B65G 1/137* (2013.01); *B65G 47/61* (2013.01); *B65G 2201/0297* (2013.01)

(58) Field of Classification Search
None
See application file for complete search history.

(56) References Cited

U.S. PATENT DOCUMENTS

| | | | |
|---|---|---|---|
| 9,633,879 B2* | 4/2017 | Ito | H01L 21/67769 |
| 10,196,214 B2* | 2/2019 | Motoori | B61K 1/02 |
| 10,734,267 B2* | 8/2020 | Motoori | H01L 21/67736 |

(Continued)

FOREIGN PATENT DOCUMENTS

| | | |
|---|---|---|
| JP | 2012-066933 A | 4/2012 |
| WO | 2019/087571 A1 | 5/2019 |

OTHER PUBLICATIONS

Official Communication issued in International Patent Application No. PCT/JP2021/037889, mailed on Dec. 28, 2021.

(Continued)

*Primary Examiner* — Mark C Hageman
(74) *Attorney, Agent, or Firm* — Keating & Bennett, LLP

(57) ABSTRACT

A transport system includes a first track in a first building, a second track in a second building, overhead transport vehicles, and a relay to pass a FOUP between the overhead transport vehicles. The overhead transport vehicle traveling on a first outward path portion and the overhead transport vehicle traveling on a second return path portion can transfer the FOUP to a same storage shelf, and the overhead transport vehicle traveling on a first return path portion and the overhead transport vehicle traveling on a second outward path portion can transfer the FOUP to the same storage shelf.

4 Claims, 5 Drawing Sheets

(56) References Cited

U.S. PATENT DOCUMENTS

| | | | |
|---|---|---|---|
| 2007/0224026 A1* | 9/2007 | Chang | H01L 21/67769 |
| | | | 414/626 |
| 2012/0076623 A1* | 3/2012 | Kasuya | B61B 1/005 |
| | | | 414/340 |
| 2020/0243363 A1* | 7/2020 | Yuasa | B65G 1/0457 |

OTHER PUBLICATIONS

Official Communication issued in International Patent Application No. PCT/JP2021/037889, mailed on Jun. 29, 2023.

English translation of Official Communication issued in International Patent Application No. PCT/JP2021/037889, mailed on Dec. 28, 2021.

Official Communication issued in corresponding European Patent Application No. 21906122.3, mailed on Nov. 10, 2024, 9 pages.

* cited by examiner

TRANSPORT SYSTEM

BACKGROUND OF THE INVENTION

1. Field of the Invention

The present invention relates to a transport system.

2. Description of the Related Art

Japanese Unexamined Patent Publication No. 2012-66933 discloses a transport system including a first track provided in a first building, a second track provided in a second building different from the first building, a first overhead transport vehicle configured to travel on the first track to transport a conveyed object and to transfer the conveyed object, a second overhead transport vehicle configured to travel on the second track to transport the conveyed object and to transfer the conveyed object, and a relay unit configured to relay the conveyed object transferred from each of the first overhead transport vehicle and the second overhead transport vehicle.

In the above transport system, the conveyed object is transported between the first building and the second building via the relay unit. The relay unit is provided between the first track and the second track, and has two loading portions, on which the conveyed object is placed, provided along the first track and the second track. The first overhead transport vehicle and the second overhead transport vehicle have traveling directions opposite from each other at the relay unit. With this configuration, each of the first overhead transport vehicle and the second overhead transport vehicle places the conveyed object on the relay unit upstream in the traveling direction, and obtains the conveyed object from the relay unit downstream in the traveling direction.

SUMMARY OF THE INVENTION

In the conventional transport system, each of the first overhead transport vehicle and the second overhead transport vehicle has only one loading portion on which the conveyed object can be placed at the relay unit, and thus when a conveyed object is placed on the loading portion, another conveyed object cannot be placed thereon. Therefore, between the first track and the second track, it can be considered that a plurality of loading portions are provided along a direction in which the tracks extend. However, sometimes it is not possible to provide a required number of loading portions because space in the direction in which the tracks extend is limited.

Preferred embodiments of the present invention provide transport systems in each of which a plurality of storage sections used in inter-building transport can be appropriately provided.

A transport system according to an aspect of a preferred embodiment of the present invention includes a first track in a first building, a second track in a second building different from the first building, a first overhead transport vehicle to travel on the first track to transport a conveyed object and to transfer the conveyed object, a second overhead transport vehicle to travel on the second track to transport the conveyed object and to transfer the conveyed object, and a relay to pass the conveyed object between the first overhead transport vehicle and the second overhead transport vehicle. The relay includes a plurality of storage sections to temporarily store the conveyed object transferred from each of the first overhead transport vehicle and the second overhead transport vehicle, a first transfer track extending from the first track, allowing the first overhead transport vehicle to place the conveyed object on one of the storage sections and to obtain the conveyed object from the one of the storage sections, and a second transfer track extending from the second track, allowing the second overhead transport vehicle to place the conveyed object on one of the storage sections and to obtain the conveyed object from the one of the storage sections. The first transfer track includes a first outward path portion extending linearly, a first turning portion following the first outward path portion, and a first return path portion extending linearly following the first turning portion. The second transfer track includes a second outward path portion extending linearly, a second turning portion following the second outward path portion, and a second return path portion extending linearly following the second turning portion. The first outward path portion and the second return path portion overlap one another when viewed from a vertical direction, and the first return path portion and the second outward path portion overlap one another when viewed from the vertical direction. The first overhead transport vehicle traveling on the first outward path portion and the second overhead transport vehicle traveling on the second return path portion have a same traveling direction, and the first overhead transport vehicle traveling on the first return path portion and the second overhead transport vehicle traveling on the second outward path portion have a same traveling direction. The respective storage sections are positioned below the first outward path portion, the first return path portion, the second outward path portion, and the second return path portion, and are provided on both sides of the first outward path portion and the second return path portion and both sides of the first return path portion and the second outward path portion when viewed from the vertical direction. The first overhead transport vehicle traveling on the first outward path portion and the second overhead transport vehicle traveling on the second return path portion are each capable of transferring the conveyed object to a same storage section, and the first overhead transport vehicle traveling on the first return path portion and the second overhead transport vehicle traveling on the second outward path portion are each capable of transferring the conveyed object to a same storage section.

In a transport system according to an aspect of a preferred embodiment of the present invention, the first outward path portion and the second return path portion overlap one another when viewed from the vertical direction, the first return path portion and the second outward path portion overlap one another when viewed from the vertical direction, and the respective storage sections are provided on both sides of the first outward path portion and the second return path portion and both sides of the first return path portion and the second outward path portion when viewed from the vertical direction. In other words, the two tracks overlap one another when viewed from the vertical direction, thus making it possible to provide the storage sections on both sides of the track instead of only one side of the track. Therefore, in the transport system, even when there is little space to provide the storage sections in the direction in which the tracks (first outward path portion, second outward path portion, first return path portion, and second return path portion) extend, the required number of storage sections can be appropriately provided by utilizing space in a direction perpendicular or substantially perpendicular to the tracks.

In a preferred embodiment of the present invention, the relay may be in the first building, the second building, or between the first building and the second building. In this configuration, in any of the first building, the second building, or between the first building and the second building, the conveyed object can be passed between the first overhead transport vehicle and the second overhead transport vehicle.

In a preferred embodiment of the present invention, the first overhead transport vehicle may travel on the first transfer track in the order of the first outward path portion, the first turning portion, and the first return path portion, place a conveyed object with respect to the storage section in the first outward path portion, and obtain the conveyed object from the storage section in the first return path portion, and the second overhead transport vehicle may travel on the second transfer track in the order of the second outward path portion, the second turning portion, and the second return path portion, place a conveyed object with respect to the storage section in the second outward path portion, and obtain the conveyed object from the storage section in the second return path portion. In this configuration, in a process in which the first overhead transport vehicle travels on the first transfer track, it is possible to place and obtain the conveyed object, and in a process in which the second overhead transport vehicle travels on the second transfer track, it is possible to place and obtain the conveyed object.

In a preferred embodiment of the present invention, the first track may include a first extension track provided in the second building, the first extension track following the first outward path portion of the first transfer track, to branch out from the first turning portion and merge with the first return path portion, the second track may include a second extension track provided in the first building, the second extension track following the second outward path portion of the second transfer track, to branch out from the second turning portion and merge with the second return path portion, the first overhead transport vehicle may be capable of transferring the conveyed object in the first building and the second building, and the second overhead transport vehicle may be capable of transferring the conveyed object in the first building and the second building. In this configuration, for example, if it is not possible to transfer the conveyed object to the storage section, the overhead transport vehicle can transport the conveyed object directly to another building. Consequently, in the transport system, the efficiency of inter-building transport can be improved.

A preferred embodiment of the present invention may include a controller configured or programmed to control operations of the first overhead transport vehicle and the second overhead transport vehicle, in which the controller may control transfer of the conveyed object in the first transfer track or the second transfer track, or transport of the conveyed object to the first building or the second building, in accordance with operating statuses of the first overhead transport vehicle in the first building and the second overhead transport vehicle in the second building. In this configuration, for example, if the first overhead transport vehicle in the first building has a high operation rate, the second overhead transport vehicle transports the conveyed object to the first building, so that the first overhead transport vehicle does not have to move to the first transfer track. This enables more efficient transport.

With an aspect of a preferred embodiment of the present invention, the storage sections used in the inter-building transport can be appropriately provided and used.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described in detail below with reference to the accompanying drawings. In the description of the drawings, the same or corresponding elements will be denoted by the same reference signs and an overlapping description will be omitted.

First Preferred Embodiment

Figure 1:
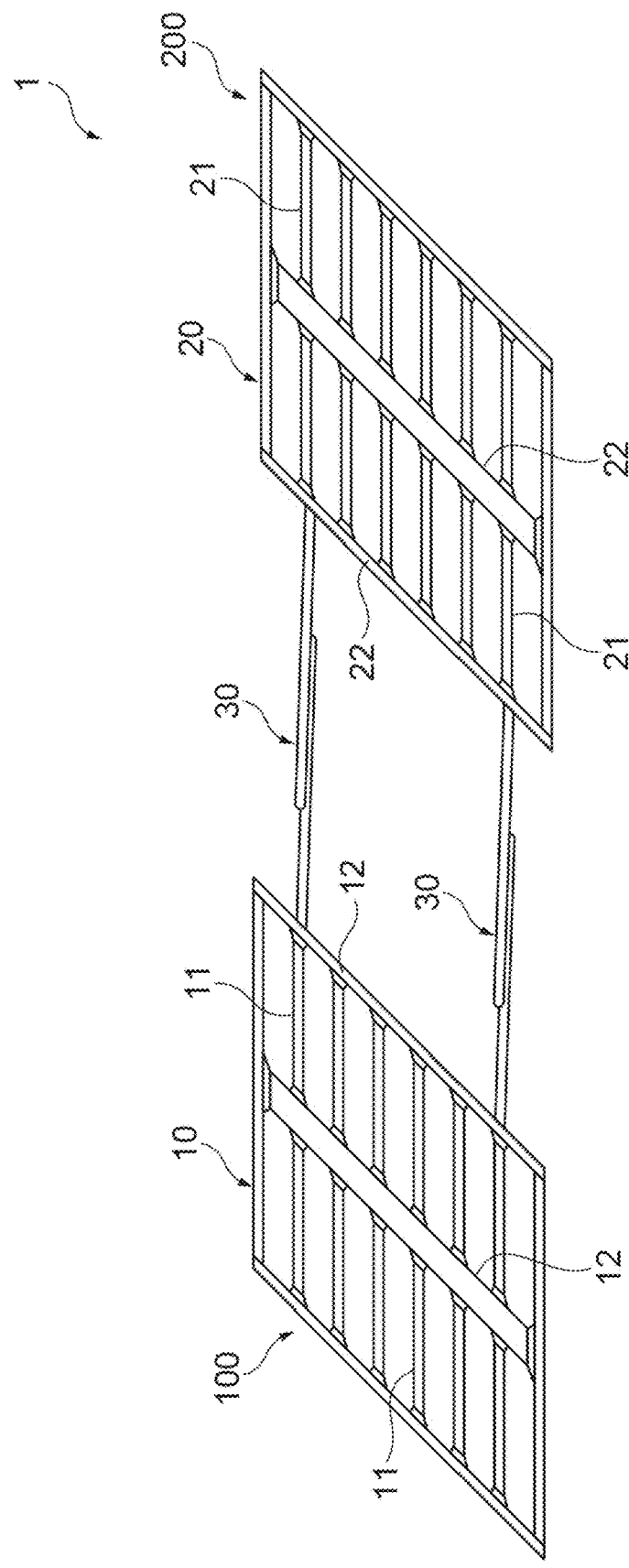
FIG. 1 is a diagram illustrating a transport system according to a first preferred embodiment of the present invention.

As illustrated in FIG. 1, a transport system 1 is a system for transporting a FOUP (conveyed object) 300. The transport system 1 includes a first track 10, a second track 20, relay units 30, overhead transport vehicles (first overhead transport vehicle) 40A and overhead transport vehicles (second overhead transport vehicle) 40B (refer to FIG. 2), and a control device 50 (refer to FIG. 3).

The transport system 1 may be installed in a semiconductor manufacturing plant provided with a plurality of semiconductor processing apparatuses (not illustrated). The transport system 1 may be installed in a first building 100 and a second building 200 in the semiconductor manufacturing plant. The first building 100 and the second building 200 are buildings in which the semiconductor processing apparatuses are installed. In the transport system 1, the FOUP 300 is transferred to a device port of the semiconductor processing apparatus by the overhead transport vehicles 40A and 40B in each of the first building 100 and the second building 200.

The first track 10 is provided in the first building 100. The first track 10 is a member on which the overhead transport vehicle 40A travels, and may be suspended from the ceiling. In the present preferred embodiment, the transport system 1 includes a plurality of systems (bays). The transport system 1 includes a plurality of intrabay routes, which are traveling paths within bays, and interbay routes, which are traveling paths connecting different bays. The first track 10 includes intrabay tracks 11 provided in a plurality of the intrabay routes and an interbay track 12 provided in the interbay route. The intrabay track 11 is set such that the overhead transport vehicle 40A travels one way clockwise. Similar to the intrabay track 11, the interbay track 12 is also set such that the overhead transport vehicle 40A travels one way clockwise. In the first track 10, settings may be made such that the overhead transport vehicle 40A travels one way counterclockwise.

The second track 20 is provided in the second building 200. The second track 20 is a member on which the overhead transport vehicle 40B travels, and is suspended from the ceiling. The second track 20 includes an intrabay track 21 provided in a portion of the intrabay routes and an interbay track 22 provided in the interbay route. The intrabay track 21 is set such that the overhead transport vehicle 40B travels one way clockwise. Similar to the intrabay track 21, the interbay track 22 is also set such that the overhead transport vehicle 40B travels one way clockwise. In the second track 20, settings may be made such that the overhead transport vehicle 40B travels one way counterclockwise.

Figure 2:
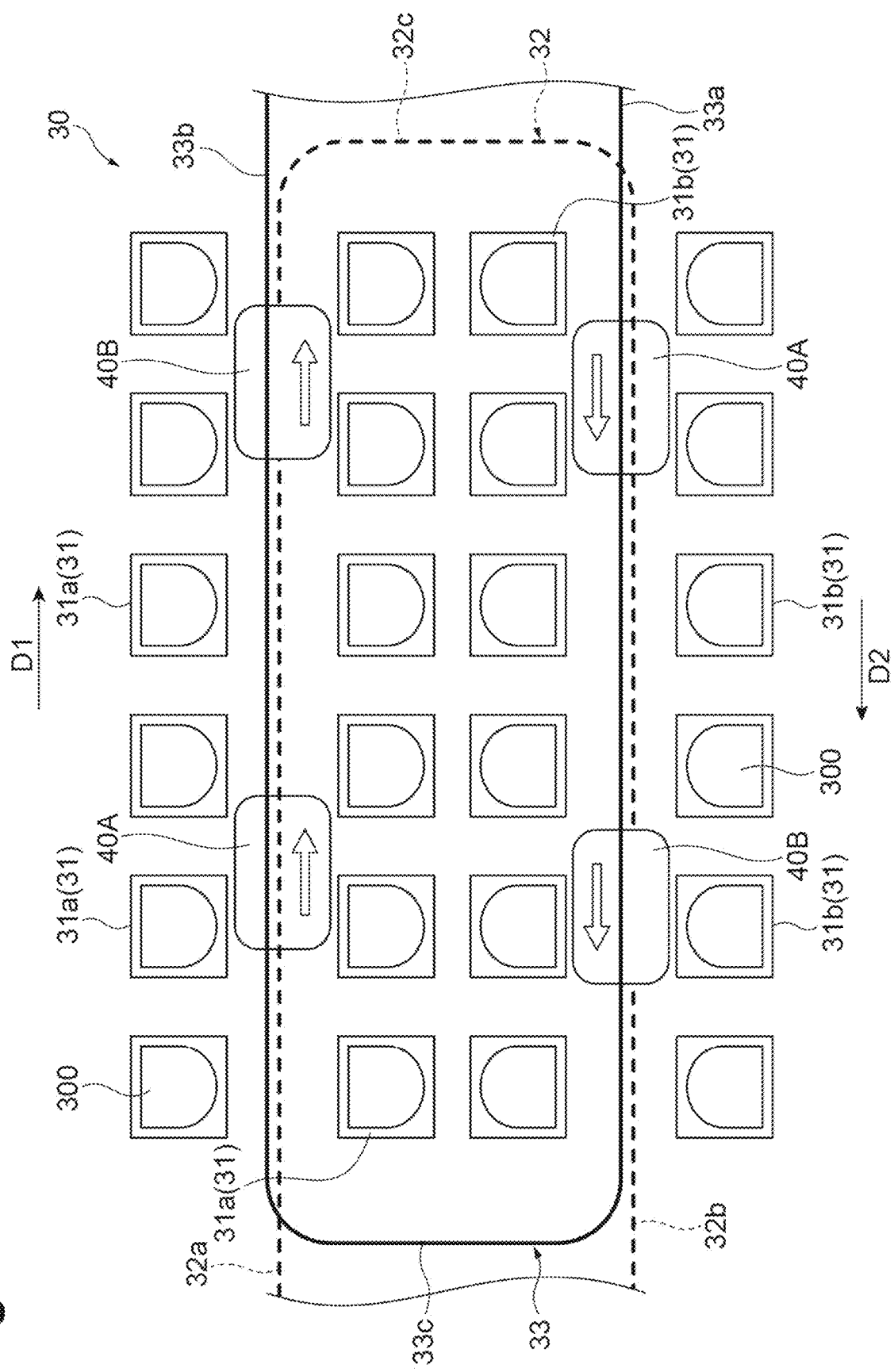
FIG. 2 is a plan view of a first transfer track and a second transfer track of the transport system in FIG. 1.

As illustrated in FIG. 2, in the relay unit 30, the FOUP 300 is passed between the overhead transport vehicle 40A and the overhead transport vehicle 40B. The relay unit 30 is provided in between or midway between the first building 100 and the second building 200. The relay unit 30 includes a storage shelf (storage section) 31, a first transfer track 32, and a second transfer track 33. In FIG. 2, the first transfer track 32 is illustrated as a dashed line and the second transfer track 33 as a solid line.

The first transfer track 32 allows the overhead transport vehicle 40A to transfer the FOUP 300 to the storage shelf 31 and the overhead transport vehicle 40A to obtain the FOUP 300 from the storage shelf 31. In the present preferred embodiment, the two first transfer tracks 32 are provided. The first transfer tracks 32 extend from the first track 10. The first transfer tracks 32 follow (are connected to) the interbay track 12.

As illustrated in FIG. 2, the first transfer tracks 32 each include a first outward path portion 32a, a first return path portion 32b, and a first turning portion 32c. The first outward path portion 32a linearly extends. In the present preferred embodiment, the first outward path portion 32a extends from the first building 100 side toward the second building 200 side. The first outward path portion 32a allows the overhead transport vehicle 40A to travel along a first direction D1. The first direction D1 is a direction in which the overhead transport vehicle heads from the first building 100 side to the second building 200 side.

The first return path portion 32b linearly extends. In the present preferred embodiment, the first return path portion 32b extends from the first building 100 side toward the second building 200 side. The first return path portion 32b is parallel or substantially parallel to the first outward path portion 32a. The first return path portion 32b allows the overhead transport vehicle 40A to travel along the second direction D2 that is opposite to the first direction D1. The second direction D2 is a direction in which the overhead transport vehicle 40A heads from the second building 200 side to the first building 100 side.

The first turning portion 32c follows (is connected to) the first outward path portion 32a and the first return path portion 32b. The first turning portion 32c connects an end of the first outward path portion 32a on the second building 200 side to an end of the first return path portion 32b on the second building 200 side. The first turning portion 32c allows the overhead transport vehicle 40A to turn the traveling direction (to change the direction) thereof. In the present preferred embodiment, the first turning portion 32c allows the overhead transport vehicle 40A to turn the traveling direction thereof from the first direction D1 to the second direction D2. The first turning portion 32c includes a linear portion extending perpendicularly or substantially perpendicularly to the first outward path portion 32a and the first return path portion 32b, and connecting portions each having a curved shape and connecting the aforementioned linear portion to the first outward path portion 32a and the first return path portion 32b. The first turning portion 32c may have a curved shape as a whole.

The second transfer track 33 allows the overhead transport vehicle 40B to place the FOUP 300 on the storage shelf 31 and allows the overhead transport vehicle 40B to obtain the FOUP 300 from the storage shelf 31. In the present preferred embodiment, the two second transfer tracks 33 are provided. The second transfer tracks 33 are extended from the second track 20. The second transfer tracks 33 follow (are connected to) the interbay track 22.

The second transfer tracks 33 each include a second outward path portion 33a, a second return path portion 33b, and a second turning portion 33c. The second outward path portion 33a linearly extends. In the present preferred embodiment, the second outward path portion 33a extends from the second building 200 side toward the first building 100 side. The second outward path portion 33a allows the overhead transport vehicle 40B to travel along the second direction D2.

The second return path portion 33b linearly extends. In the present preferred embodiment, the second return path portion 33b extends from the second building 200 side toward the first building 100 side. The second return path portion 33b is parallel to the second outward path portion 33a. The second return path portion 33b allows the overhead transport vehicle 40B to travel along the first direction D1.

The second turning portion 33c follows (is connected to) the second outward path portion 33a and the second return path portion 33b. The second turning portion 33c connects an end of the second outward path portion 33a on the first building 100 side to an end of the second return path portion 33b on the first building 100 side. The second turning portion 33c allows the overhead transport vehicle 40B to turn the traveling direction thereof. In the present preferred embodiment, the second turning portion 33c allows the overhead transport vehicle 40B to turn the traveling direction thereof from the second direction D2 to the first direction D1. The second turning portion 33c includes a linear portion extending perpendicularly or substantially perpendicularly to the second outward path portion 33a and second return path portion 33b and connecting portions each having a curved shape and connecting the aforementioned linear portion to the second outward path portion 33a and the second return path portion 33b. The second turning portion 33c may have a curved shape as a whole.

The first outward path portion 32a and the second return path portion 33b overlap one another when viewed from the vertical direction. The first return path portion 32b and the second outward path portion 33a overlap one another when viewed from the vertical direction. The first transfer track 32 and the second transfer track 33 are provided such that a closed region as viewed from the vertical direction is provided. The first turning portion 32c (linear portion) of the first transfer track 32 and the second turning portion 33c (linear portion) of the second transfer track 33 are provided opposite each other when viewed from the vertical direction.

Figure 3:
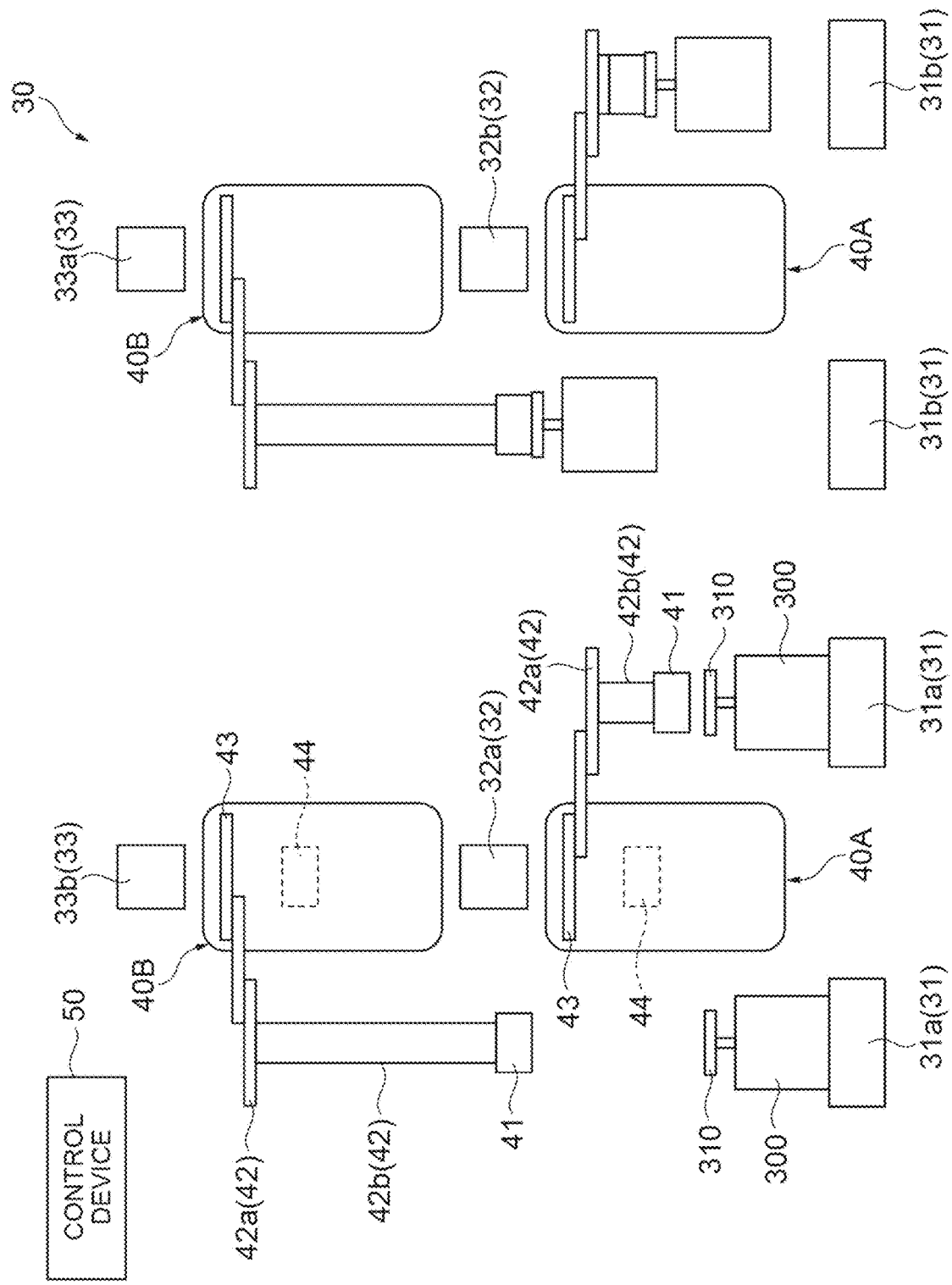
FIG. 3 is a front view of a portion of the first transfer track and the second transfer track.

As illustrated in FIG. 3, the first outward path portion 32a and the first return path portion 32b of the first transfer track 32 and the second outward path portion 33a and the second return path portion 33b of the second transfer track 33 are provided at different heights in the up-down direction. The first outward path portion 32a and the first return path portion 32b of the first transfer track 32 are positioned below the second outward path portion 33a and the second return path portion 33b of the second transfer track 33. In other words, the second outward path portion 33a and the second return path portion 33b of the second transfer track 33 are positioned above the first outward path portion 32a and the first return path portion 32b of the first transfer track 32.

On each storage shelf 31, the FOUP 300 is placed. A plurality of the storage shelves 31 each support the FOUP 300. The storage shelves 31 are suspended from the ceiling, for example. Each storage shelf 31 can be an overhead buffer (OHB). A region on the storage shelf 31 can have the FOUP 300 placed thereon. That region on the storage shelf 31 is a temporary storage region to which the overhead transport vehicles 40A and 40B stopped on the first track 10 and the second track 20 are capable of transferring the FOUP 300. The storage shelf 31 may be configured to have one FOUP 300 or a plurality of FOUPs 300 placed thereon.

The storage shelves 31 includes a plurality of storage shelves 31a, 31b. As illustrated in FIG. 2 or FIG. 3, the storage shelves 31a are provided on positions each to which the overhead transport vehicle 40A traveling on the first outward path portion 32a and the overhead transport vehicle 40B traveling on the second return path portion 33b can transfer the FOUP 300. The storage shelves 31b are provided on positions each to which the overhead transport vehicle 40A traveling on the first return path portion 32b and the overhead transport vehicle 40B traveling on the second outward path portion 33a can transfer the FOUP 300.

Specifically, the respective storage shelves 31 are positioned below the first outward path portion 32a, the first return path portion 32b, the outward return path portion 33a, and the second return path portion 33b, and are provided on both sides of the first outward path portion 32a and the second return path portion 33b and both sides of the first return path portion 32b and the second outward path portion 33a when viewed from the vertical direction. In other words, in an opposing direction of the first outward path portion 32a and the first return path portion 32b (opposing direction of the second outward path portion 33a and the second return path portion 33b), a pair of the storage shelves 31a are provided on positions where the first outward path portion 32a and the second return path portion 33b are interposed therebetween when viewed from the vertical direction. Similarly, a pair of the storage shelves 31b are provided on positions where the first return path portion 32b and the second outward path portion 33a are interposed therebetween when viewed from the vertical direction.

As illustrated in FIG. 2, the storage shelves 31 are provided along the first outward path portion 32a, the first return path portion 32b, the second outward path portion 33a, and the second return path portion 33b. In the present system, the six storage shelves 31 are provided. On the storage shelves 31, the direction of the FOUP 300 with respect to the traveling direction of the overhead transport vehicles 40A and 40B is constant.

Examples of the overhead transport vehicles 40A and 40B include an overhead hoist transfer (OHT), or the like. The FOUP 300 is a container (FOUP: Front Opening Unified Pod) for storing semiconductor wafers.

As illustrated in FIG. 3, the overhead transport vehicles 40A and 40B each include a gripping unit 41, a lifting mechanism 42, and a movement mechanism 43. The overhead transport vehicles 40A and 40B each include a transmitter/receiver 44 capable of communicating with the control device 50.

The gripping unit 41 is a device configured to grip and release the FOUP 300. The gripping unit 41 can grip a flange portion 310 of the FOUP 300. When each of the overhead transport vehicles 40A and 40B receives the FOUP 300 from the storage shelf 31, the corresponding gripping unit 41 grips the flange portion 310 of the FOUP 300. The gripping unit 41 releases the flange portion 310 of the FOUP 300 when each of the overhead transport vehicles 40A and 40B places the FOUP 300 on the storage shelf 31.

A lifting mechanism 42 is a device configured to raise and lower the gripping unit 41 in the vertical direction. The lifting mechanism 42 can raise and lower the gripping unit 41 in the vertical direction. The lifting mechanism 42 includes a hoisting mechanism 42a and a belt 42b. The hoisting mechanism 42a is supported by the movement mechanism 43. The hoisting mechanism 42a is a device configured to wind up and wind down the belt 42b in the vertical direction. The hoisting mechanism 42a can wind up and wind down the belt 42b in the vertical direction. The belt 42b is suspended from the hoisting mechanism 42a, and supports the gripping unit 41 at the lower end thereof. The lifting mechanism 42 can wind up and wind down the FOUP 300 gripped by the gripping unit 41 for a distance at least allowing the FOUP 300 to reach the storage shelf 31.

The movement mechanism 43 is a device configured to move the gripping unit 41 and the lifting mechanism 42 from each of the overhead transport vehicles 40A and 40B with respect to both sides thereof. Specifically, the movement mechanism 43 can move the gripping unit 41 and the lifting mechanism 42 from each of the overhead transport vehicles 40A and 40B with respect to the horizontal direction perpendicular or substantially perpendicular to the advancing direction of the overhead transport vehicles 40A and 40B. The movement mechanism 43 can move the gripping unit 41 and the lifting mechanism 42 to above each of the storage shelves 31. When the FOUP 300 is gripped by the gripping unit 41, the movement mechanism 43 can move the FOUP 300 to or from above the storage shelf 31 in the vertical direction.

As illustrated in FIG. 2, the traveling directions of the overhead transport vehicle 40A traveling on the first outward path portion 32a and the overhead transport vehicle 40B traveling on the second return path portion 33b coincide in the first direction D1. The traveling directions of the overhead transport vehicle 40A traveling on the first return path portion 32b and the overhead transport vehicle 40B traveling on the second outward path portion 33a coincide in the second direction D2.

Each of the overhead transport vehicles 40A and 40B stopped on the first transfer track 32 and the second transfer track 33, respectively, can transfer the FOUP 300 with respect to the storage shelf 31. In other words, each of the overhead transport vehicles 40A and 40B can transfer the FOUP 300 with respect to the same storage shelf 31. Thus, both of the overhead transport vehicle 40A on the first transfer track 32 and the overhead transport vehicle 40B on the second transfer track 33 can deliver and receive (transfer) the FOUP 300 to or from the storage shelf 31.

The overhead transport vehicles 40A and 40B each move the FOUP 300 upward above the corresponding storage shelf 31, by operating the movement mechanism 43 from a state where the gripping unit 41 grips the flange portion 310 of the FOUP 300. Subsequently, each of the overhead transport vehicles 40A and 40B causes the corresponding hoisting mechanism 42a to operate to wind down the belt 42b, thus lowering the FOUP 300 to place the FOUP 300 on the storage shelf 31. As described above, each of the overhead transport vehicles 40A and 40B transfers (places) the FOUP 300 to (on) the storage shelf 31.

Each of the overhead transport vehicles 40A and 40B causes the gripping unit 41 to grip the flange portion 310 of the FOUP 300 placed on the storage shelf 31. Subsequently, each of the overhead transport vehicles 40A and 40B causes the hoisting mechanism 42a to operate to wind up the belt 42b, thus raising the FOUP 300. Subsequently, each of the overhead transport vehicles 40A and 40B causes the movement mechanism 43 to operate to move the FOUP 300. As described above, each of the overhead transport vehicles 40A and 40B transfers (receives) the FOUP 300 from the storage shelf 31.

The transmitter/receiver 44 is provided at a predetermined position on each of the overhead transport vehicles 40A and 40B. The transmitter/receiver 44 in each of the overhead transport vehicles 40A and 40B is capable of communicating with the control device 50. The transmitter/receiver 44 and the control device 50 communicate with each other, for example, via feeder lines (not illustrated) laid along the first track 10 or the second track 20. The overhead transport vehicles 40A and 40B each transport the FOUP 300, based on a transport command received by the transmitter/receiver 44.

The control device 50 controls operations of the overhead transport vehicles 40A and 40B. The control device 50 is an electronic control unit including a central processing unit (CPU), a read only memory (ROM), a random access memory (RAM), and the like. The control device 50 transmits transport commands to the overhead transport vehicles 40A and 40B.

The operations of the overhead transport vehicle 40A and the overhead transport vehicle 40B will then be described. As illustrated in FIG. 2, the overhead transport vehicle 40A, after transporting the FOUP 300 obtained in the intrabay route of the first building 100 to the first transfer track 32, travels on the first transfer track 32 in the order of the first outward path portion 32a, the first turning portion 32c, and the first return path portion 32b. The overhead transport vehicle 40A stops at a position of a vacant storage shelf 31a in the first outward path portion 32a and places the FOUP 300 on the storage shelf 31a. The overhead transport vehicle 40A, after placing the FOUP 300 on the storage shelf 31a, travels on the first turning portion 32c to change the traveling direction from the first direction D1 to the second direction D2. The overhead transport vehicle 40A travels to the first return path portion 32b and stops at a predetermined position to obtain the FOUP 300 from the storage shelf 31b. The overhead transport vehicle 40A transports the obtained FOUP 300 to the first building 100.

The overhead transport vehicle 40B, after transporting the FOUP 300 obtained in the intrabay route of the second building 200 to the second transfer track 33, travels on the second transfer track 33 in the order of the second outward path portion 33a, the second turning portion 33c, and the second return path portion 33b. The overhead transport vehicle 40B stops at a position of a vacant storage shelf 31b in the second outward path portion 33a and places the FOUP 300 on the storage shelf 31b. The overhead transport vehicle 40B, after placing the FOUP 300 on the storage shelf 31b, travels on the second turning portion 33c to change the traveling direction from the second direction D2 to the first direction D1. The overhead transport vehicle 40B travels to the second return path portion 33b and stops at a predetermined position to obtain the FOUP 300 from the storage shelf 31a. The overhead transport vehicle 40B transports the obtained FOUP 300 to the second building 200.

As explained above, in the transport system 1 according to the present preferred embodiment, in the relay unit 30, the first outward path portion 32a and the second return path portion 33b overlap one another when viewed from the vertical direction, and the first return path portion 32b and the second outward path portion 33a overlap one another when viewed from the vertical direction. The respective storage shelves 31 are provided on both sides of the first outward path portion 32a and the second return path portion 33b and both sides of the first return path portion 32b and the second outward path portion 33a when viewed from the vertical direction. In other words, because the two tracks overlap one another when viewed from the vertical direction, the storage shelves 31 can be provided on both sides of the track instead of on only one side of the track. Therefore, in the transport system 1, even when there is little space to dispose the storage shelves 31 in the direction in which the tracks (first outward path portion 32a, second outward path portion 33a, first return path portion 32b, and second return path portion 33b) extend, the required number of storage shelves 31 can be appropriately provided by utilizing space in the direction perpendicular or substantially perpendicular to the tracks.

In the transport system 1 according to the present preferred embodiment, the relay unit 30 is provided in a midway between the first building 100 and the second building 200. In this configuration, there is no need to provide space for disposing the relay unit 30 in the inside of each of the first building 100 and the second building 200. Thus, internal space of each of the first building 100 and the second building 200 can be effectively utilized.

In the transport system 1 according to the present preferred embodiment, the overhead transport vehicle 40A travels on the first transfer track 32 in the order of the first outward path portion 32a, the first turning portion 32c, and the first return path portion 32b. The overhead transport vehicle 40A places the FOUP 300 on the storage shelf 31a in the first outward path portion 32a and obtains the FOUP 300 from the storage shelf 31b in the first return path portion 32b. The overhead transport vehicle 40B travels on the second transfer track 33 in the order of the second outward path portion 33a, the second turning portion 33c, and the second return path portion 33b. The overhead transport vehicle 40B places the FOUP 300 on the storage shelf 31b in the second outward path portion 33a and obtains the FOUP 300 from the storage shelf 31a in the second return path portion 33b. In this configuration, the overhead transport vehicle 40A can place and obtain the FOUP 300 in a process of traveling on the first transfer track 32, and the overhead transport vehicle 40B can place and obtain the FOUP 300 in a process of traveling on the second transfer track 33.

Second Preferred Embodiment

Figure 4:
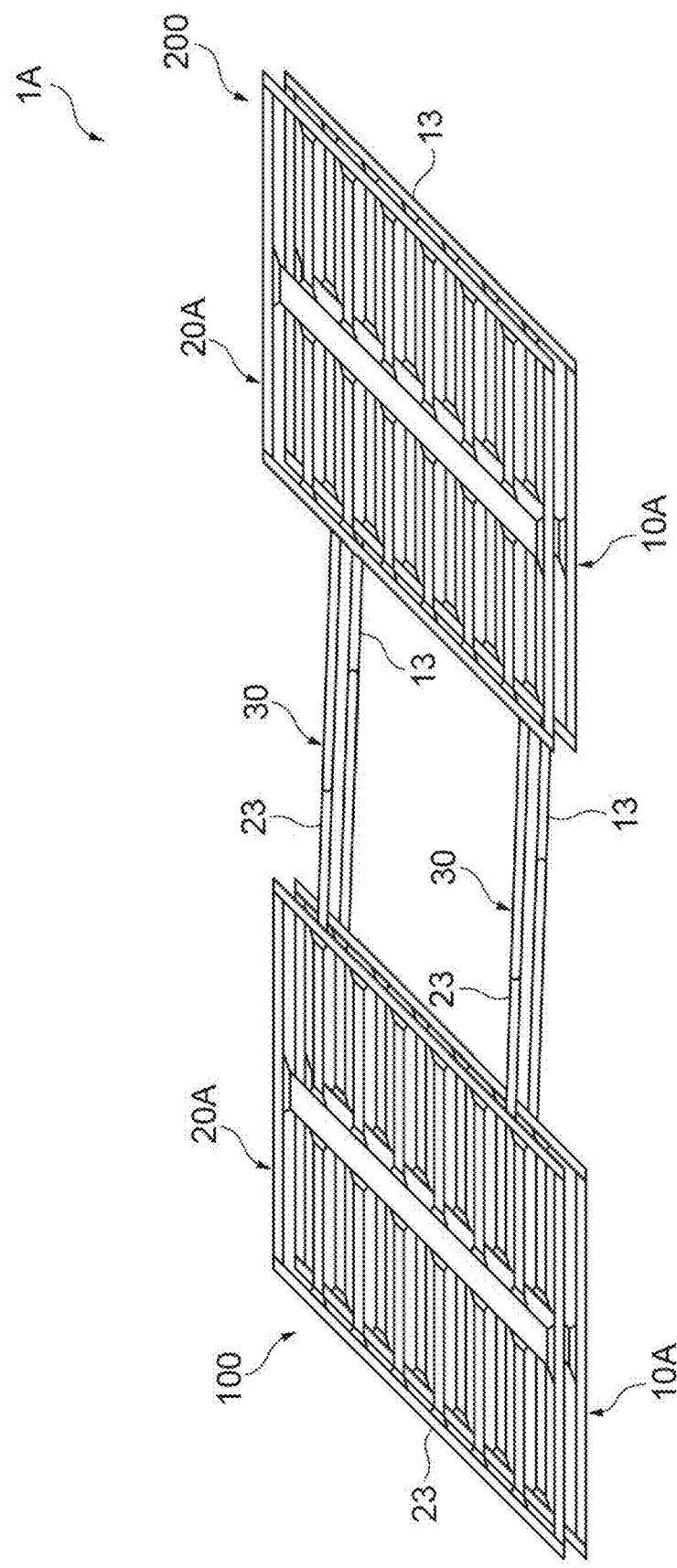
FIG. 4 is a diagram illustrating a transport system according to a second preferred embodiment of the present invention.
Figure 5:
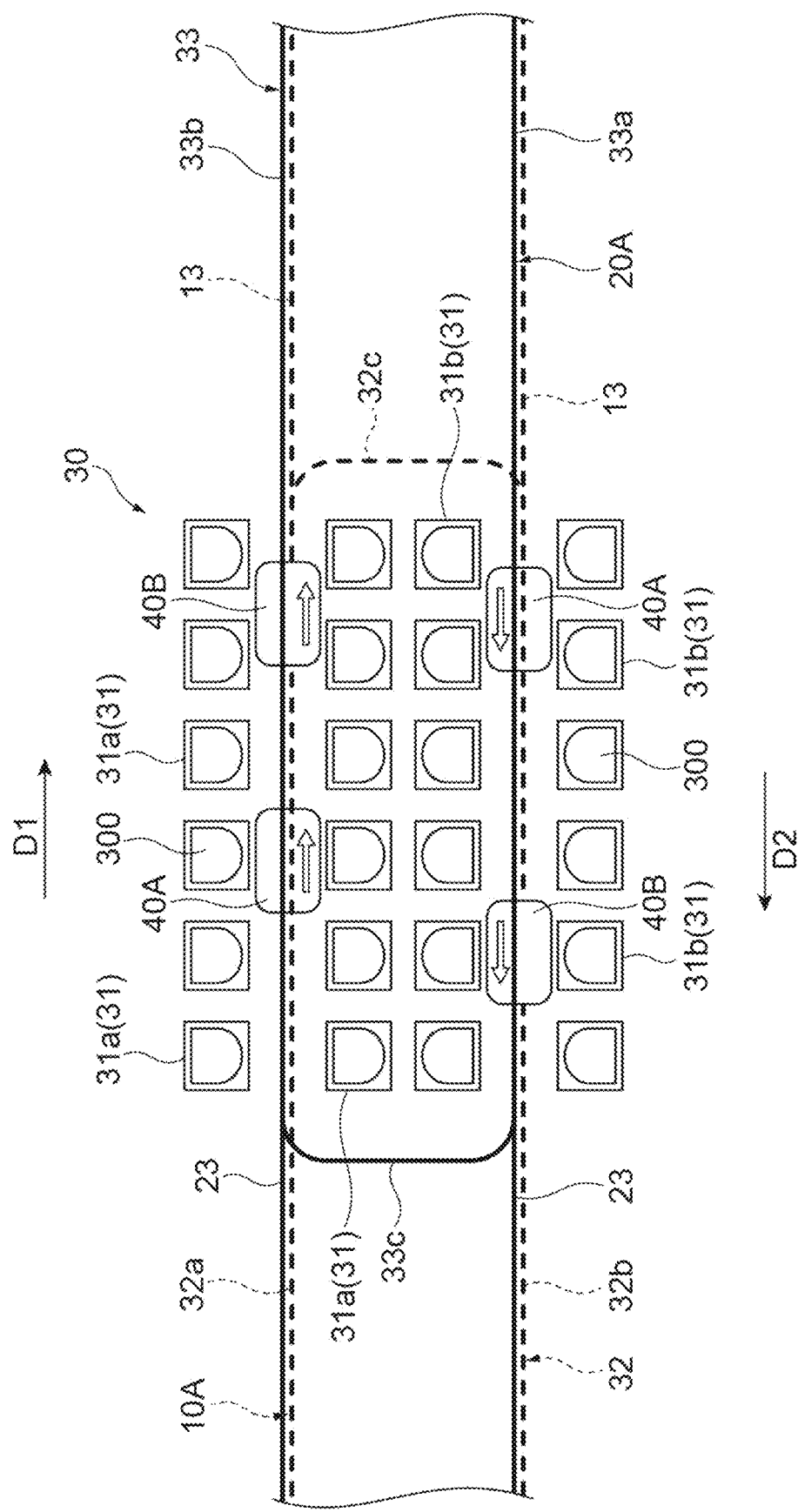
FIG. 5 is a plan view of the first transfer track and the second transfer track of the transport system illustrated in FIG. 4.

A second preferred embodiment will then be described. As illustrated in FIGS. 4 and 5, a transport system 1A includes first tracks 10A, second tracks 20A, the relay units 30, the overhead transport vehicles 40A and the overhead transport vehicles 40B, and the control device 50 (refer to FIG. 3).

The first tracks 10A each include first extension tracks 13 provided in the second building 200, one of the first extension tracks 13 follows (is connected to) the first outward path portion 32a of the first transfer track 32 to branch out from the first turning portion 32c, and another first extension track 13 merges with the first return path portion 32b. The first extension tracks 13 follow (are connected to) the first outward path portion 32a and the first return path portion 32b to linearly extend from the first building 100 side to the second building 200 side, and are provided in the inside of the second building 200. The first extension tracks 13 include intrabay tracks provided in the plurality of intrabay routes and an interbay track provided in the interbay route, in the inside of the second building 200. The overhead transport vehicle 40A is capable of transferring the FOUP 300 in the first building 100 and the second building 200. The overhead transport vehicle 40A basically transports the FOUP 300 in the first building 100.

The second tracks 20A each include second extension tracks 23 provided in the first building 100, one of the second extension tracks 23 follows (is connected to) the second outward path portion 33a of the second transfer track 33 to branch out from the second turning portion 33c, and another second extension track 23 merges with the second return path portion 33b. The second extension tracks 23 follow (are connected to) the second outward path portion 33a and the second return path portion 33b to linearly extend from the second building 200 side to the first building 100 side, and are provided in the inside of the first building 100. The second extension tracks 23 include the intrabay tracks provided in the intrabay routes and the interbay track provided in the interbay route, in the inside of the first building 100. The overhead transport vehicle 40B is capable of transferring the FOUP 300 in the first building 100 and the second building 200. The overhead transport vehicle 40B basically transports the FOUP 300 in the second building 200.

The transport system 1A allows, in the relay units 30, the FOUP 300 to be passed between the overhead transport vehicles 40A and 40B via the storage shelf 31.

The operations of the overhead transport vehicle 40A and the overhead transport vehicle 40B will then be described. The overhead transport vehicle 40A, when transferring the FOUP 300 to the storage shelf 31 of the relay unit 30, travels on the first transfer track 32 in the order of the first outward path portion 32a, the first turning portion 32c, and the first return path portion 32b. The overhead transport vehicle 40A, when transporting the FOUP 300 to the second building 200, passes through the first outward path portion 32a of the first transfer track 32 and enters the first extension track 13 when heading to the second building 200. The overhead transport vehicle 40A, when returning from the second building 200 to the first building 100, enters the first return path portion 32b of the first transfer track 32 from the first extension track 13.

The overhead transport vehicle 40B, when transferring the FOUP 300 to the storage shelf 31, travels on the second transfer track 33 in the order of the second outward path portion 33a, the second turning portion 33c, and the second return path portion 33b. The overhead transport vehicle 40B, when transporting the FOUP 300 to the first building 100, passes through the second outward path portion 33a of the second transfer track 33 and enters the second extension track 23 when heading to the first building 100. The overhead transport vehicle 40B, when returning from the first building 100 to the second building 200, enters the second return path portion 33b of the second transfer track 33 from the second extension track 23.

In the transport system 1A, the control device 50 controls transfer of the FOUP 300 on the first transfer track 32 or the second transfer track 33, or transport of the FOUP 300 to the first building 100 or the second building 200, depending on the operating status of the overhead transport vehicle 40A in the first building 100 and the operating status of the overhead transport vehicle 40B in the second building 200. The operating status includes the number of vehicles in operation, the operation rate, and the ratio of the number of vehicles in operation of the overhead transport vehicles 40A and 40B in the first building 100 and the second building 200.

For example, if the number of vehicles in operation of the overhead transport vehicles 40A has reached the specified number in the first building 100, the control device 50 transmits a transport request to the overhead transport vehicle 40B to transfer the FOUP 300 to the storage shelf 31. If, for example, the number of vehicles in operation of the overhead transport vehicles 40A has not reached the specified number in the first building 100, the control device 50 transmits a transport request to the overhead transport vehicle 40B to transport the FOUP 300 to the first building 100.

As explained above, in the transport system 1A according to the present preferred embodiment, the overhead transport vehicle 40A is capable of transferring the FOUP 300 in the first building 100 and the second building 200, and the overhead transport vehicle 40B is capable of transferring the FOUP 300 in the first building 100 and the second building 200. As a result, in the transport system 1A, for example, if the FOUP 300 cannot be transferred to the storage shelf 31, the overhead transport vehicles 40A and 40B can transport the FOUP 300 directly to other buildings. Consequently, in the transport system 1A, the efficiency of inter-building transport can be improved.

In the transport system 1A according to the present preferred embodiment, the control device 50 controls transfer of the FOUP 300 on the first transfer track 32 or the second transfer track 33, or transport of the FOUP 300 to the first building 100 or the second building 200, depending on the operating status of the overhead transport vehicle 40A in the first building 100 and the operating status of the overhead transport vehicle 40B in the second building 200. In this configuration, for example, if the overhead transport vehicle 40A in the first building 100 has a high operation rate, the overhead transport vehicle 40B transports the FOUP 300 to the first building 100, so that the number of overhead transport vehicles in the first building 100 increases. This enables more efficient transport in the first building 100.

In the foregoing, certain preferred embodiments of the present invention have been described above, but the present invention is not necessarily limited to the foregoing preferred embodiments, and various modifications are possible within a scope not departing from the gist of the present invention.

In the above preferred embodiments, a form in which the first transfer track 32 and the second transfer track 33 are provided between the first building 100 and the second building 200 is described as an example. However, the first transfer track 32 and the second transfer track 33 may be provided in the inside of the first building 100 or the second building 200.

In the above preferred embodiments, a form is described as an example in which, in an opposing direction of the first outward path portion 32a and the first return path portion 32b (an opposing direction of the second outward path portion 33a and the second return path portion 33b), a pair of the storage shelves 31 are oppositely provided with the first outward path portion 32a and the second return path portion 33b interposed therebetween or with the first return path portion 32b and the second outward path portion 33a interposed therebetween. However, the storage shelves 31 may be provided in a staggered fashion, for example.

In the above preferred embodiments, a form is described as an example in which, for the storage shelves 31 oppositely provided in the opposing direction of the first outward path portion 32a and the first return path portion 32b (the opposing direction of the second outward path portion 33a and the second return path portion 33b), the same number of storage shelves 31 are oppositely provided. However, the number of storage shelves 31 does not have to be equal on both sides, and may be set according to design.

In the above preferred embodiments, a form in which the conveyed object is the FOUP 300 is described as an example. However, the conveyed object may be, for example, a container for storing a glass substrate, a reticle pod, a FOSB, a SMIF Pod, a general component, and the like.

In the above preferred embodiments, a form in which the transport system 1 is installed in the semiconductor manufacturing plant is described as an example. However, the transport system is also applicable to other facilities, not being limited to the semiconductor manufacturing plant.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A transport system comprising:
a first track in a first building;
a second track in a second building different from the first building;
a first overhead transport vehicle to travel on the first track to transport a conveyed object and to transfer the conveyed object;
a second overhead transport vehicle to travel on the second track to transport the conveyed object and to transfer the conveyed object; and
a relay to pass the conveyed object between the first overhead transport vehicle and the second overhead transport vehicle; wherein
the relay includes:
a plurality of storage sections to temporarily store the conveyed object transferred from each of the first overhead transport vehicle and the second overhead transport vehicle;
a first transfer track extending from the first track, allowing the first overhead transport vehicle to place the conveyed object on one of the storage sections and to obtain the conveyed object from the one of the storage sections; and
a second transfer track extending from the second track, allowing the second overhead transport vehicle to place the conveyed object on one of the storage sections and to obtain the conveyed object from the one of the storage sections;
the first transfer track includes a first outward path portion extending linearly, a first turning portion following the first outward path portion, and a first return path portion extending linearly following the first turning portion;
the second transfer track includes a second outward path portion extending linearly, a second turning portion following the second outward path portion, and a second return path portion extending linearly following the second turning portion;
the first outward path portion and the second return path portion overlap one another when viewed from a vertical direction, and the first return path portion and the second outward path portion overlap one another when viewed from the vertical direction;
the first overhead transport vehicle traveling on the first outward path portion and the second overhead transport vehicle traveling on the second return path portion have a same traveling direction, and the first overhead transport vehicle traveling on the first return path portion and the second overhead transport vehicle traveling on the second outward path portion have a same traveling direction;
respective ones of the plurality of storage sections are positioned below the first outward path portion, the first return path portion, the second outward path portion, and the second return path portion, and are provided on both sides of the first outward path portion and the second return path portion and both sides of the first return path portion and the second outward path portion when viewed from the vertical direction;
the first overhead transport vehicle traveling on the first outward path portion and the second overhead transport vehicle traveling on the second return path portion are each capable of transferring the conveyed object to the same storage section, and the first overhead transport vehicle traveling on the first return path portion and the second overhead transport vehicle traveling on the second outward path portion are each capable of transferring the conveyed object to the same storage section;
the first track includes a first extension track in the second building, the first extension track following the first outward path portion of the first transfer track, to branch out from the first turning portion and merge with the first return path portion;
the second track includes a second extension track in the first building, the second extension track following the second outward path portion of the second transfer track, to branch out from the second turning portion and merge with the second return path portion;
the first overhead transport vehicle is capable of transferring the conveyed object in the first building and the second building; and
the second overhead transport vehicle is capable of transferring the conveyed object in the first building and the second building.

2. The transport system according to claim 1, wherein the relay is in the first building, the second building, or between the first building and the second building.

3. The transport system according to claim 1, wherein the first overhead transport vehicle is operable to:
travel on the first transfer track in an order of the first outward path portion, the first turning portion, and the first return path portion;
place a conveyed object with respect to the storage section in the first outward path portion; and
obtain the conveyed object from the storage section in the first return path portion; and
the second overhead transport vehicle is operable to:
travel on the second transfer track in an order of the second outward path portion, the second turning portion, and the second return path portion;
place a conveyed object with respect to the storage section in the second outward path portion; and
obtain the conveyed object from the storage section in the second return path portion.

4. The transport system according to claim 1, further comprising a controller configured or programmed to control operations of the first overhead transport vehicle and the second overhead transport vehicle; wherein
the controller is configured or programmed to control transfer of the conveyed object in the first transfer track or the second transfer track, or transport of the conveyed object to the first building or the second building, in accordance with operating statuses of the first overhead transport vehicle in the first building and the second overhead transport vehicle in the second building.

* * * * *